United States Patent [19]

Massie, II et al.

[11] Patent Number: 5,490,550
[45] Date of Patent: Feb. 13, 1996

[54] CUT RESISTANT TIRE

[75] Inventors: Johnny D. Massie, II, Lexington, Ky.; Paul W. Hobart, Wadsworth; Jerry Malin, Akron, both of Ohio

[73] Assignee: The Goodyear Tire & Rubber Company, Akron, Ohio

[21] Appl. No.: 250,235

[22] Filed: May 27, 1994

Related U.S. Application Data

[63] Continuation of Ser. No. 964,229, Oct. 21, 1992, abandoned.

[51] Int. Cl.[6] .................... B60C 9/00; B60C 9/18; B60C 19/12
[52] U.S. Cl. .............. 152/193; 139/425 R; 152/526; 152/527; 152/DIG. 14
[58] Field of Search ..................... 152/193, 195, 152/198, 202, 451, 526–527, 556, 563, DIG. 14, 169–170, 175–176, 187–188; 156/96; 139/425 R

[56] References Cited

U.S. PATENT DOCUMENTS

| | | |
|---|---|---|
| 316,615 | 4/1885 | Gilbert . |
| 752,228 | 2/1904 | Irwin ............................ 152/202 X |
| 770,795 | 9/1904 | Buxton .......................... 152/202 X |
| 963,882 | 7/1910 | Eynon ........................... 152/202 X |
| 1,007,018 | 10/1911 | Wilson et al. .................. 152/202 X |
| 1,122,249 | 12/1914 | Brandenburger . |
| 1,143,265 | 6/1915 | Gautier . |
| 1,188,062 | 6/1916 | Gammeter . |
| 1,201,257 | 10/1916 | Cobb . |
| 1,207,709 | 12/1916 | Campbell . |
| 1,228,650 | 6/1917 | Christian . |
| 1,236,227 | 8/1917 | Stewart . |
| 1,271,388 | 7/1918 | Taylor . |
| 1,343,368 | 6/1920 | Kinsley . |
| 1,365,280 | 1/1921 | Sacks . |
| 1,438,663 | 12/1922 | Roderick ....................... 152/202 X |
| 1,560,700 | 11/1925 | Langer .......................... 152/563 |
| 1,561,759 | 11/1925 | Wetmore ....................... 152/202 X |
| 1,602,870 | 10/1926 | Villiers . |
| 2,059,764 | 11/1936 | Zerillo . |
| 2,408,368 | 10/1946 | Brickman . |
| 2,523,182 | 9/1950 | Battaglia ....................... 152/202 |
| 2,749,959 | 6/1956 | Kunel . |
| 2,952,292 | 9/1960 | Olsen . |
| 2,987,095 | 6/1961 | Toulmin, Jr. . |
| 3,087,699 | 4/1963 | Foster . |
| 3,216,476 | 11/1965 | Reuter et al. . |
| 3,607,497 | 9/1971 | Chrobak . |
| 3,682,222 | 8/1972 | Alderfer . |
| 3,897,814 | 8/1975 | Grawey . |
| 4,011,899 | 3/1977 | Chamberlin . |
| 4,106,957 | 8/1978 | Tournoy . |
| 4,137,112 | 1/1979 | Hedlund . |
| 4,161,203 | 7/1979 | Suzuki et al. . |
| 4,219,601 | 8/1980 | Inoue et al. . |
| 4,235,274 | 11/1980 | Suzuki et al. . |
| 4,277,296 | 7/1981 | Skidmore . |
| 4,289,185 | 9/1981 | Franchini et al. . |
| 4,347,290 | 8/1982 | Haemers . |
| 4,399,853 | 8/1983 | Morimoto et al. . |
| 4,506,718 | 3/1985 | Abe et al. . |
| 4,830,781 | 5/1989 | Oswald . |

FOREIGN PATENT DOCUMENTS

| | | |
|---|---|---|
| 0399795 | 11/1990 | European Pat. Off. . |
| 0573237 | 12/1993 | European Pat. Off. . |
| 0588780 | 3/1994 | European Pat. Off. . |
| 8522773 | 11/1985 | Germany . |

OTHER PUBLICATIONS

PCT document WO 92/08603, May 29, 1992, to King, Michael J.

*Primary Examiner*—Adrienne C. Johnstone
*Attorney, Agent, or Firm*—David E. Wheeler

[57] ABSTRACT

A cut resistant pneumatic tire is provided. The tire has a monofilament wire structure embedded in or under its tread or sidewall, and is used in off the road applications such as mining. The monofilament wire has a diameter of 0.4 to 1.2 mm and is made of brass plated steel. The wire may be woven or may have a spring link configuration. Two monofilament wires may be twisted together, and when two such wires are used, the total diameter is 0.8 to 1.4 mm.

3 Claims, 4 Drawing Sheets

CUT RESISTANT TIRE

This is a Continuation of Ser. No. 07/964,229, filed Oct. 21, 1992, now abandoned.

BACKGROUND OF THE INVENTION

The invention relates to cut resistant pneumatic tires, especially off-the-road tires and heavy duty off-the-road tires having typically 1 to 36 carcass plies and 6 belts (in a radial ply tire) or 4 breakers (in a bias ply tire), and one to four sets of beads.

Heavy duty off-the-road tires, because of the nature of their use, are exposed to cutting and delamination caused by sharp rocks and uneven terrain. In the prior art, this problem was sometimes addressed by including wire fragments embedded in the rubber of the tread and sidewalls of such tires. Although shredded wire works well to prevent cut growth, it may be relatively expensive (brass coated wire works best), and is very difficult to handle and process into rubber. Shredded wire tends to jam the processing equipment and causes accelerated wear of the processing equipment.

This problem was addressed in U.S. patent application Ser. No. 07/600,380, now U.S. Pat. No. 5,173,136, issued Dec. 22, 1992, by incorporating RFL coated monofilament fibers into the tread rubber and sidewall rubber of mining tires.

It is an object of the present invention to provide a cut resistant tire, which is easier to process and to build than a tire reinforced with shredded wire.

Other objects of the invention will be apparent from the following specification and claims.

PRIOR ART

U.S. Pat. No. 122,249 to Brandenburger relates to a tire having a carcass comprising a chained structure which interlocks both beads of the tire. The rings of the chain are made of spring steel wire and the construction is described as being armor or a metallic fabric.

U.S. Pat. No. 1,143,265 to Gautier relates to armoring pneumatic tires, and describes a structure similar to a bicycle chain comprising the carcass reinforcement of the tire.

U.S. Pat. No. 1,201,257 to Cobb relates to a fabric for tires in which longitudinal wire cords or filaments are interwoven with organic fibers. The structure described is used in a crown area of the tire as a belt structure.

U.S. Pat. No. 1,207,709 to Campbell relates to fabric for tires in which wire is interwoven with organic cords or fibers in a wire/organic composite structure.

U.S. Pat. No. 1,228,650 to Christian relates to a pneumatic tire in which a woven wire fabric is used in the crown area and upper sidewall of the tire. The woven wire structure is said to provide resistance against perforation, lines 17–18, and blowouts resulting from high internal pneumatic pressure, and from injury termed "stone bruise", lines 27–30.

U.S. Pat. No. 1,236,227 to Stewart relates to an armored tire structure which comprises a series of interconnected rings which also interconnect with the beads of the tire. The rings are described in the specification as being a series of chains disposed transversely within the body of the shoe.

U.S. Pat. No. 1,271,388 to Taylor relates to a tire shoe or casing which comprises metal strands, preferably woven together.

U.S. Pat. No. 1,365,208 to Sacks relates to a tire casing which comprises a circumferentially endless knitted fabric. The fabric is said to be flexible wire at column 1, line 51.

U.S. Pat. No. 1,602,870 to Villiers relates to a sheet material for covering, lining, or closing constructions of all kinds, particularly bomb-proof awnings. The structure comprises woven wire in a rubber composite.

U.S. Pat. No. 2,987,095 to Toulmin, Jr. relates to a tire cord structure and describes a tire wherein reinforcing metal is incorporated and thoroughly united with the rubber in the body of the casing. The individual strands may be woven to provide a fabric structure or interwoven middle layer, column 2, lines 43–45.

U.S. Pat. No. 4,235,274 to Suzuki et al, relates to a tire structure having a reinforcing layer composed of a helicaly formed filament or bundle of wire in the crown area of the tire. According to the claims, the bundle comprises at least two filaments and in use in a tire, it appears that five to seven filaments comprise the bundle used.

SUMMARY OF THE INVENTION

A cut resistant pneumatic tire is provided which comprises at least a pair of parallel annular beads, carcass plies comprising parallel cord reinforcement wrapped around the beads, a tread disposed radially over the carcass plies in a crown area of the tire, and sidewalls disposed radially over the carcass plies between the tread and the beads. The tires may be bias ply or radial ply construction.

The improvement in the tire comprises the inclusion of radially continuous monofilament wire having a diameter of 0.4 to 1.2 mm in or under the tread. The monofilament wire may be woven or may comprise linked springs. Two monofilament wires may be used together, and in such an embodiment, the combined diameter of the wires is 0.8 to 1.4 mm.

In the illustrated embodiment where the wire is woven, wires in the "weft" direction may have the same diameter as wires in the "warp" direction, and such wires may be fused at their point of intersection. In a preferred embodiment, the wires in the warp and the weft directions are free so that they may pantograph during the building of the tire.

In an alternative embodiment, the wires are coiled into springs and the springs are linked together so that a coil of each spring overlaps with a coil of an adjacent spring.

The wire may also be formed in ring structures and chain structures.

DETAILED DESCRIPTION OF THE INVENTION

Figure 1:
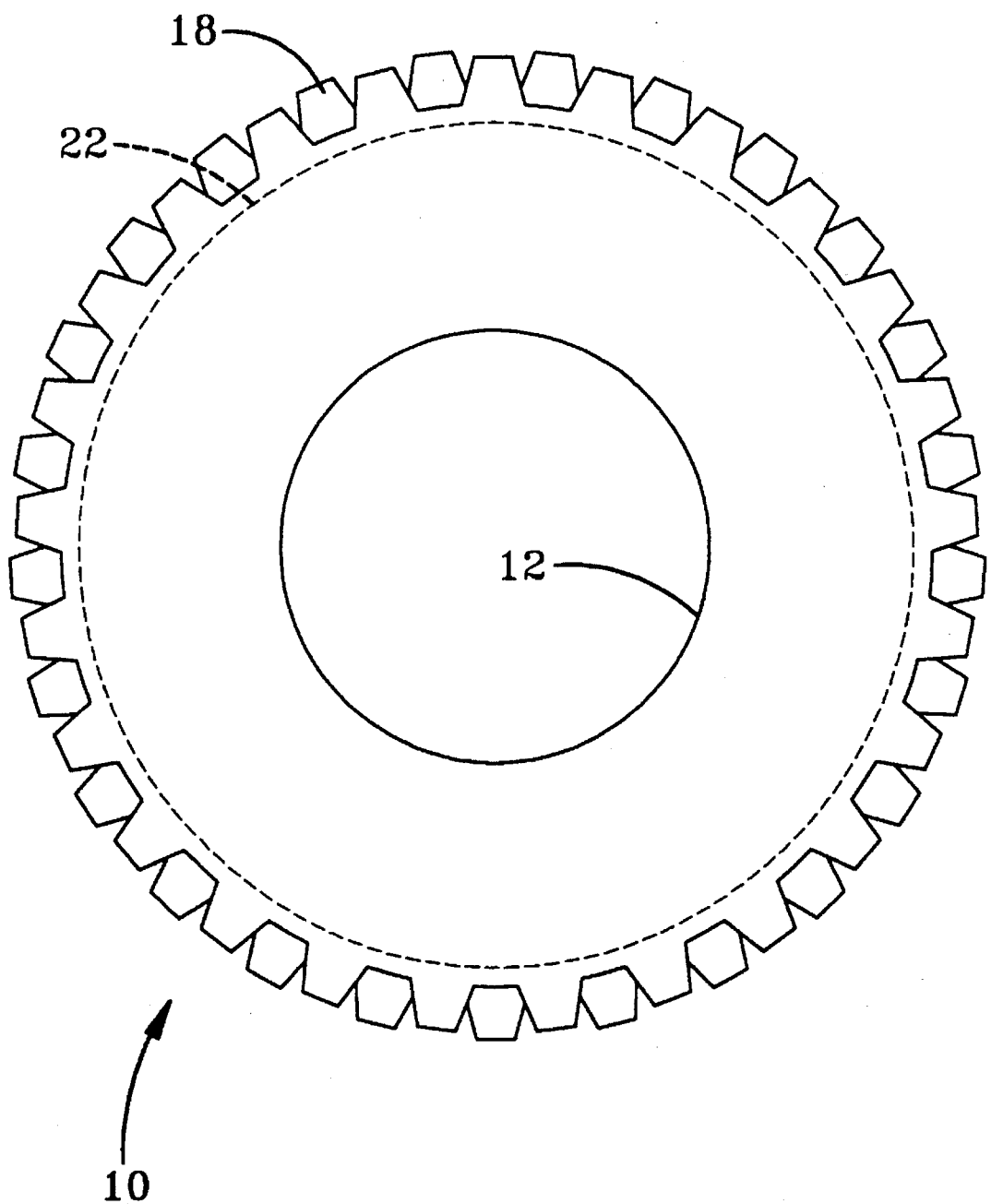
FIG. 1 illustrates a heavy duty off-the-road radial tire having a wire filament structure embedded therein.
Figure 2:
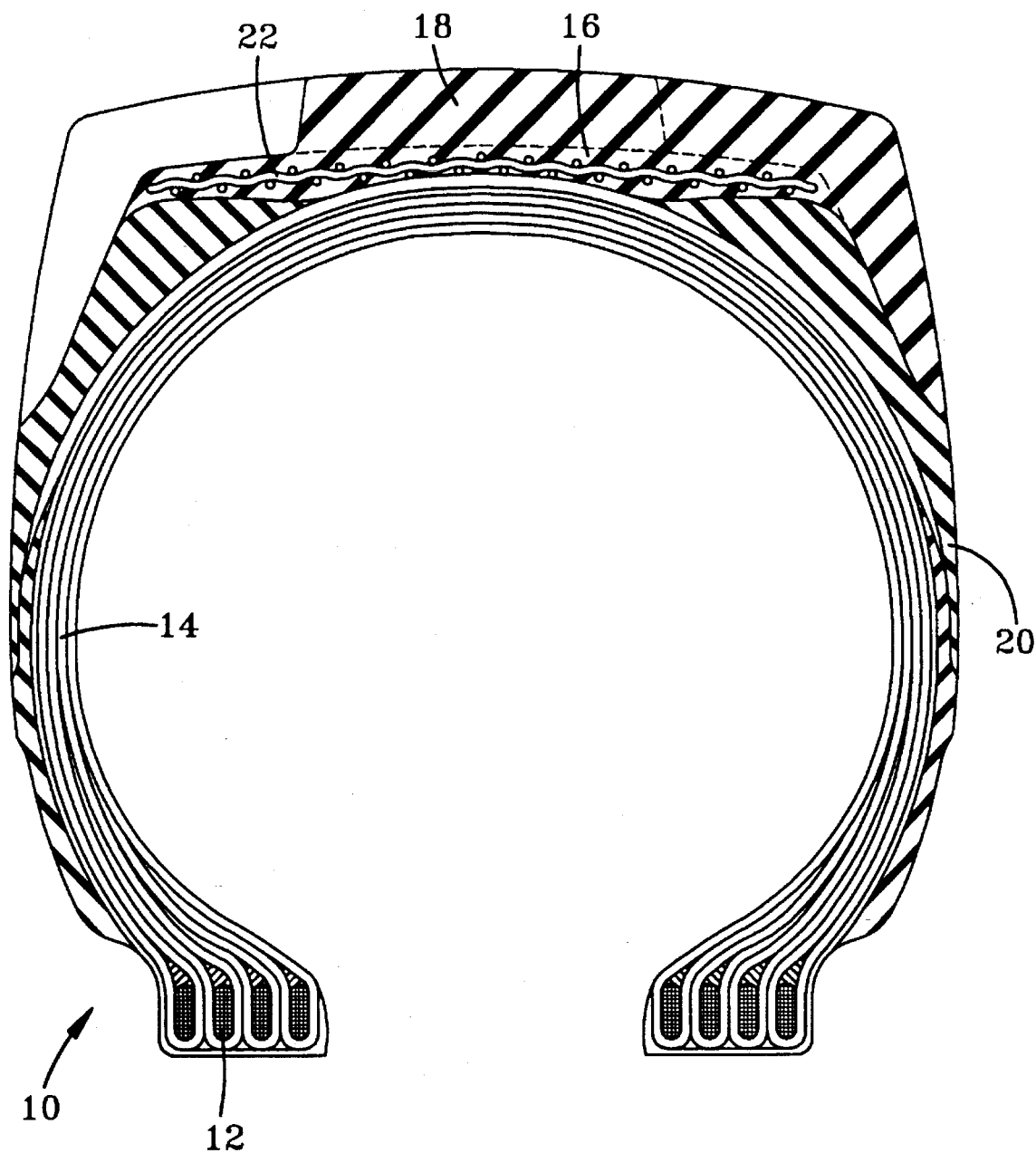
FIG. 2 illustrates a cross section of a bias ply tire having monofilament wire embedded therein.

With reference now to FIGS. 1 and 2, a heavy duty, off-the-road tire 10 of the invention is illustrated. The tire comprises beads 12, carcass plies 14 wrapped around beads 12, tread base 16 disposed radially over carcass plies 14 in a crown area of tire 10, tread 18 disposed radially over tread base 16, and sidewalls 20, disposed between the tread and beads 12. Wire 22 is embedded in or radially under the tread or the sidewall. FIG. 1 represents a radial tire having one set of beads, and FIG. 2 represents a bias ply tire having four sets of beads.

In the illustrated embodiment, wire 22 has a diameter of 0.4 to 1.2 mm and is made of brass coated steel. The tensile strength of the wire used is 1300 to 3500 MPa, preferably 1350 to 3250 MPa. The elongation at break of the brass coated wire, before incorporation in an armor structure, was 2 to 8%. Those skilled in the art will recognize that the structure of the wire, especially when a spring structure is used, will significantly increase the potential elongation. Examples of monofilament steel wire which can be used in the invention are 1040c steel wire with a tensile strength of 1365 MPa, and 1092c steel wire with a tensile strength of 1820 MPa. As used in the illustrated embodiments, the wire was preformed into its desired structure by Justesen Industries, 1090 Yew Ave., Elaine, Washington 98230, and by National Standard, Corbin, Kentucky 40701.

The wire can be used in the tire at an end count of, theoretically 3 to 30 epi, although end counts of 3 to 10 epi (ends per inch) are believed sufficient. In the illustrated embodiments, end counts of 3 to 6 epi are preferred, and in two preferred embodiments 3 and 4 epi were used, to provide proper rivet as well as the strength and penetration resistance required.

The wire is brass plated or coated using conventional techniques.

Figure 3:
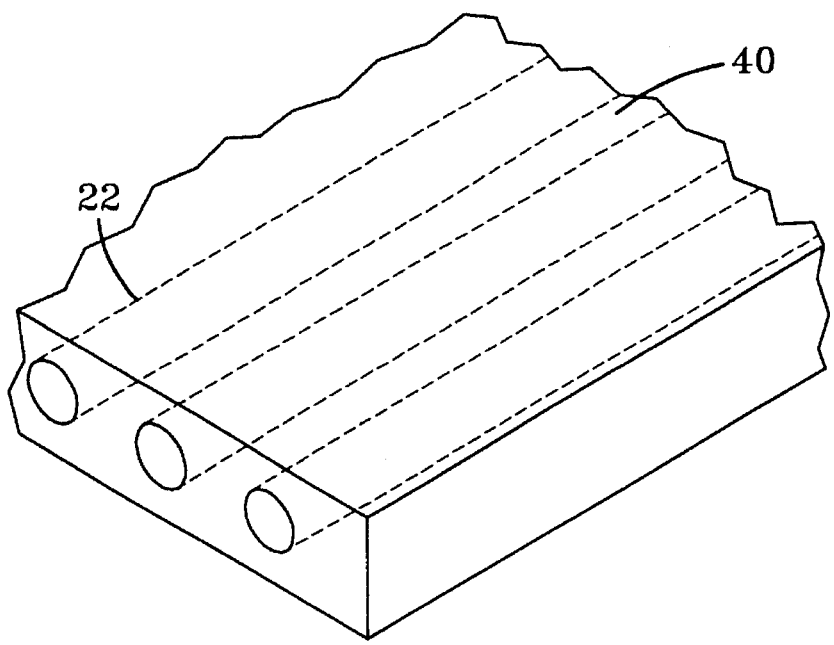
FIG. 3 illustrates individual wires embedded in rubber.
Figure 4:
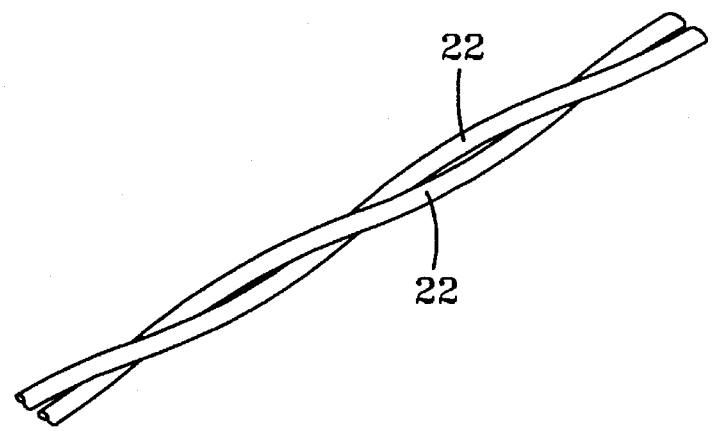
FIG. 4 illustrates two monofilaments twisted together.

With reference to FIG. 3, the wire may be calendered so that the wires 22 are embedded in a layer of rubber 40, independent of one another, or two wires can be twisted together, with a 12 to 25 mm lay length as illustrated in FIG. 4.

In a preferred embodiment, the wires will be formed or combined in an armor type structure so that the wires work together and support each other in the tire structure. The structure provides flexibility as well as strength and penetration resistance. The wire is brass plated, preferably before incorporation into the armor structure. The armor structure may comprise interconnected rings, chain links, woven structures, interlocking springs, or any other such structure known in the prior art.

Figure 5:
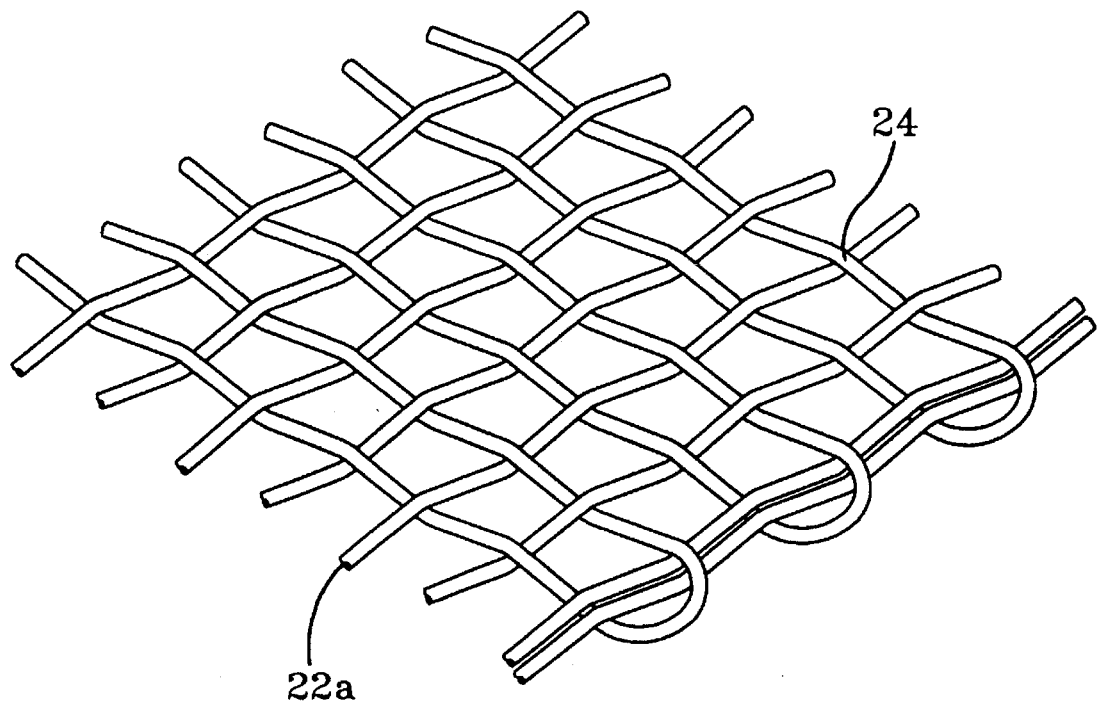
FIG. 5 illustrates a structure for monofilament woven wire that can be used in the tire.

With reference to FIG. 5, in one embodiment, the wire may be woven having wires in a "weft" direction at an angle of about 90° with wires woven in a "warp" direction. Those skilled in the art will recognize that the woven wire structure may also be pantographed such that an acute angle between wires of intersection may be from 30° to 89°. Consequently, an obtuse angle in the pantographed woven structure will be from 91° to 150°.

In a preferred embodiment, the wires will be woven at a 90° angle and placed in the tire construction at substantially a 45° angle with respect to the equatorial plane of the tire. When the tire expands in the mold during the manufacturing process, the woven structure pantographs, making possible the expansion of the wire structure together with the expansion of the tire.

In an alternative embodiment, the intersections 24 of the wires may be fused, providing a structured relationship whereby adjacent wires provide support for individual wires. The inherent flexibility of the wires provide a flexibility to the structure as a whole. In the manufacture of a tire with such a structure, an overlap splice may be used, and the structure expands by slipping at the overlap splice during the molding of the tire.

Figure 6:
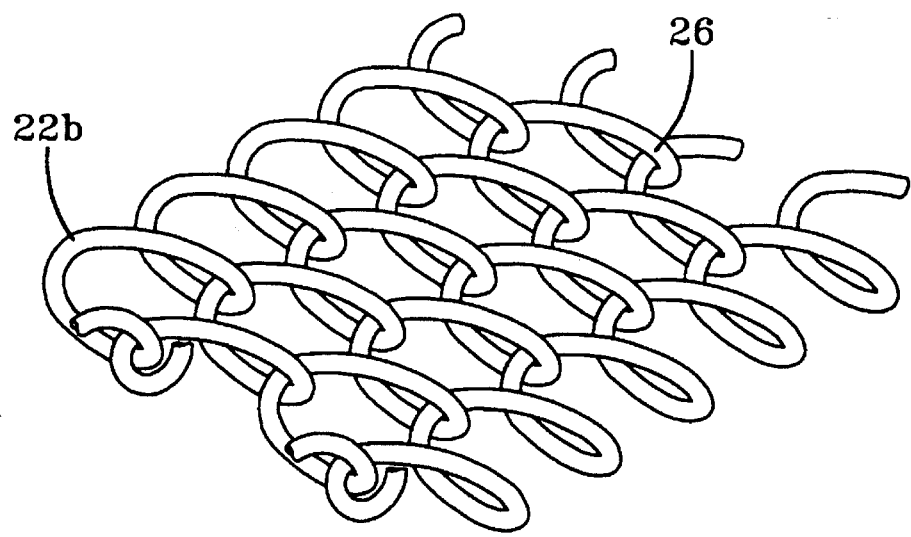
FIG. 6 illustrates a structure for linked springs that can be used in the tire.

With reference now to FIG. 6, wires 22b may be coiled into a spring, and the wires may be interlocked by causing each coil 26 of a spring to have an interlocking relationship with a coil of an adjacent spring. In such a structure, the individual springs move independently of one another, but have a limited range of motion such that the structure as a whole has substantial flexibility within the limited range, but the structure has great strength and resistance to distortion at the limits of the range.

It is preferred that the structure containing the interlocking springs be applied to the tire such that the individual springs have an angle of substantially 45° with the equatorial plane of the tire, and the structure is applied using an overlap splice. The structure will slip at an overlap splice, allowing the expansion needed, during the molding of the tire.

The tires 10 of the invention may be built as is conventional in the art except that the wire structure, for example structure 22a or structure 22b, can be rolled onto the tire in the same manner as a belt ply before application of the tread.

The wire may be rubber coated by calendering prior to application. Alternatively, the wire may be applied to the tire as manufactured, and the rubber of the tread and/or tread base will flow around the wire in the molding of the tire. The brass coating on the wire assures good adhesion between the wire and the rubber of the tread base and/or tread.

While specific embodiments of the invention have been illustrated and described, those skilled in the art will recognize that the invention may be variously modified and practiced without departing from the spirit of the invention. The invention is limited only by the following claims.

What is claimed is:

1. A heavy duty pneumatic tire comprising at least a pair of parallel annular beads, carcass plies wrapped around said beads, reinforcement plies disposed radially over said carcass plies in a crown area of the tire, a tread disposed radially over said reinforcement plies, and sidewalls disposed between said tread and said beads, the improvement wherein continuous monofilament brass coated steel wire having a diameter of 0.4 to 1.2 mm is included in or radially under said tread as the warp and weft wires in a woven structure, wherein when said tire is in an unvulcanized and unexpanded state said warp and weft wires in said woven structure are inclined at an angle of substantially 45 degrees with respect to the equatorial plane of the tire, said warp and weft wires being free to move relative to one another, and wherein before incorporation in a wire structure said brass coated steel wire has an elongation at break of 2 to 8% and a tensile strength of 1300 MPa to 3500 MPa.

2. The tire of claim 1 wherein said wires are woven at a density of 3–6 epi (ends per inch) in the warp direction and a density of 3–6 epi in the weft direction.

3. The tire of claim 1 wherein said monofilament wire is woven having wires in the weft direction having the same diameter as wires in the warp direction.

* * * * *